United States Patent
Heuvelman et al.

(12) 
(10) Patent No.: US 6,577,326 B1
(45) Date of Patent: Jun. 10, 2003

(54) COMPUTER-CONTROLLED HOME THEATER INDEPENDENT USER-CONTROL

(75) Inventors: Jeroen Heuvelman, Campbell, CA (US); Steven Taylor Pancoast, San Jose, CA (US); Christopher D. Coley, Morgan Hill, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 574 days.

(21) Appl. No.: 08/920,751

(22) Filed: Aug. 29, 1997

(51) Int. Cl.$^7$ ................................................ G09G 5/00
(52) U.S. Cl. ........................ 345/717; 345/718; 345/771
(58) Field of Search ........................ 348/552; 364/146; 345/302, 348, 716, 717, 718, 771; 714/38

(56) References Cited

U.S. PATENT DOCUMENTS 5,475,835 A * 12/1995 Hickey ........................ 348/552
5,621,662 A * 4/1997 Humphries et al. ......... 364/146
5,657,221 A * 8/1997 Warman et al. ......... 345/348 X

OTHER PUBLICATIONS

"Gateway 2000: Destination D5–200", Bruce Brown, PC Magazine Edition May 6, 1997.

* cited by examiner

Primary Examiner—Ba Huynh
Assistant Examiner—Chadwick A. Jackson
(74) Attorney, Agent, or Firm—Jeroen Heuvelman

(57) ABSTRACT

A home entertainment system comprises a sub-system with audio/video functionalities, a computer and a device interface that interconnects the sub-system and the computer. The computer controls the sub-system through a software application. The computer and the sub-system have separate user-controls. In case the computer crashes, the user can still control those audio/video functionalities of the sub-system that are independent of the computer.

5 Claims, 3 Drawing Sheets

COMPUTER-CONTROLLED HOME THEATER INDEPENDENT USER-CONTROL

FIELD OF THE INVENTION

The invention relates to an information processing system with a subsystem for selectively providing specific content information. Content information includes, for example, video and/or audio and/or graphics information. The system has also a computer for running a software application to control the providing of the specific content information. The system has a user-interface structure for user-control of the specific content information via interaction with the software application. The invention relates in particular, but not exclusively, to a home entertainment system.

BACKGROUND ART

A home entertainment system is a piece of equipment intended for the domestic environment and capable of processing in a synergetic manner audio video and graphics information that is being supplied by a variety of information sources. An example of a home entertainment system is the Destination D5-200 computer of Gateway 2000. See, for example, the article "Gateway 2000: Destination D5-200", Bruce Brown, PC Magazine edition of May 6, 1997. This computer has all its user-control functionalities, regarding information-content selection, bundled in software applications run on a single operating system. The Destination D5-200 has a TV tuner on its video card, and the computer must be on and running in order to watch TV.

There is a problem associated with having the computer controlling the user-interactive functionalities of the home entertainment system. For example, the computer may crash in such a way that the user is barred from controlling the conventional audio and video functionalities. If the user had been watching the television and the system before the computer crashed, there would be no way for the user to select another video source, e.g, a VCR or a video game, or to change the channels. The system is to be rebooted in order to restore user-control. This may well take several minutes. Note that also during rebooting of the computer the conventional audio-video functionalities are not available to the user.

Home entertainment systems with PC-based consumer apparatus have been becoming increasingly more sophisticated. Modular configurations and open architectures are believed to form the paradigm for such systems. Failure of the computer may occur more frequently in such an architecture, typically when its components are cooperating asynchronously. An open architecture system can be modified and extended at will. Future functionalities, presently unknown, or customized functionalities, will be added to the existing system as an after-market add-on. Proper functioning under each and every circumstance cannot be guaranteed anymore, simply because many of all possible processes could not have been contemplated in advance by the manufacturer, let alone tried out in the development phase.

OBJECT OF THE INVENTION

It is therefore an object of the invention to provide an information processing system that is more user-friendly and robust than that of the prior art.

SUMMARY OF THE INVENTION

To this end, the invention provides an information processing system that comprises a sub-system for selectively providing specific content information, e.g., in the form of video content and audio content. The system also has a computer coupled to the subsystem. The computer nuns a software application to control the specific content information, e.g., the selection or combination thereof. A first user-interface structure provides user-control of the specific content information via interaction with the software application. A second user-interface structure provides user-control of the specific content information independently of the computer.

Providing independent user-control procedures largely solves the problem mentioned above. When the control path via the computer is blocked due to some software failure or during rebooting, the other control path via the second user-interface remains available. Regardless of the computer crashing or rebooting, the user maintains control over the content information provided by the subsystem, at least over that content information that is not created by the computer itself. Also, this relieves the computer from context switching between software applications when the user changes an audio or video functionality (e.g. sound volume or video brightness).

Preferably, the system tests periodically if the computer is capable of controlling the sub-system, and disables the data path from the computer to the sub-system upon a negative test result. For example, the computer sends a periodic heart beat signal, together with the data stream. The heart beat ascertains that the computer is up and running. Absence of the heart beat implies that the path from the computer should be disabled.

Alternatively, the sub-system periodically sends a signal to the computer, also referred to as heart beat, to trigger a confirmation of its being alive. Again in the absence of a response the path from the computer is disabled.

The heart beat rate sent can be varied dependent on the operational mode or status (e.g., sleep, fully operational) of the sender in order to notify the receiver of that mode or status. For example, the heart beat rate is lowered to a non-zero value when the computer sleeps and is increased when the computer is coming back to life and automatically returns to full system operation. In such a case, the sub-system is notified of the fact that the computer is sleeping by the different rate and the sub-system is prevented from prematurely awakening the computer. When the rate has dropped to zero, the path should be disabled.

Alternatively, the heart beat can be suspended after the computer has notified the sub-system of its deliberately going into sleep mode. The sub-system then knows that the absence of a heart beat is not caused by the computer crashing and does not have to disable the control path from the computer to the sub-system.

BRIEF DESCRIPTION OF THE DRAWINGS

The invention is explained in more detail by way of example and with reference to the accompanying drawings, wherein.

Throughout the figures same reference numerals indicate similar or corresponding features.

PREFERRED EMBODIMENTS

Figure 1:
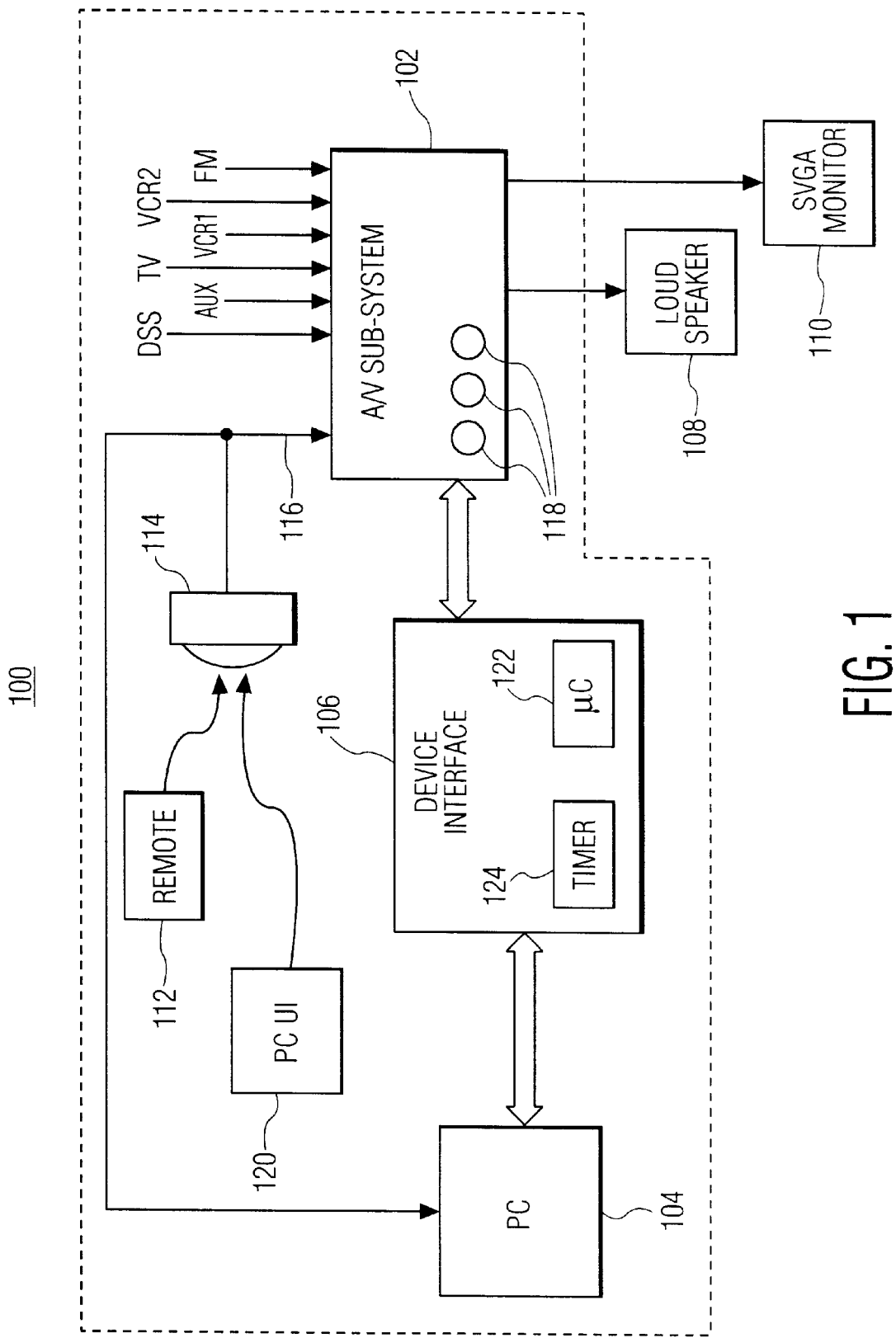
FIG. 1 is a block diagram of a data processing system of the invention.

FIG. 1 is a functional block diagram of a data processing system 100 of the invention. System 100 comprises an AV-sub-system 102 with audio and video functionalities, a computer such as a PC 104, and a device interface 106 interconnecting sub-system 102 and PC 104.

Sub-system 102 comprises for example, the following devices (not shown): a DVD drive, a TV-tuner, an FM-tuner, and an audio amplifier with Dolby® Digital, and Dolby® Pro-Logic capabilities ("Dolby" is a trademark of Dolby Laboratories). Sub-system 102 has inputs for receipt of signals from various sources (not shown): DSS (Digital Satellite System), cable TV, first and second videocassette recorders VCR1 and VCR2, radio FM, etc., and outputs for connection to loudspeakers 108 and to an SVGA monitor 110. AV-sub-system 102 provides direct and instantaneous user-control over the audio and video functionalities through, e.g., the combination of a remote control device 112 and an infra-red eve 114 that has a connection 116 to sub-system 102, or through front keys 118.

PC 104 provides control over the audio and video functionalities of AV-sub-system 102 via software applications including, e.g., a sophisticated GUI for source selection, settings of the audio and video functionalities such as selection of brightness and contrast, and selection of audio modes (monaural, Stereophonic or surround), video games, Internet access, and software upgrades for the processors (not shown) in future versions of AV-sub-system 102. PC 104 may be provided with software applications to combine video and audio content supplied by multiple content information sources DSS, VCR1, VCR2, TV, FM with computer-generated graphics and sounds.

System 100 has a user-interface 120 that comprises, for example, a wireless keyboard and a wireless mouse for communication with PC 104 via IR-eye 114. Remote 112 and UI 120 use different IR-communication protocols or different command sets. Monitor 110 supplies visual feedback to the user when interface 120 is being manipulated.

Device-interface 106 lets PC 104 control AV-sub-system 102 and lets sub-system 102 notify PC 104 of various events in sub-system 102 that are relevant to tie software applications running on PC 104. Also, interface 106 passes on the IR commands sent by UI 120 and received by IR eye 114 connected to sub-system 102. Interface 106 comprises a microcontroller 122 that monitors the status of sub-system 102 and notifies PC 104 of any status changes. For example, when the user adjusts the sound volume through remote 112, microcontroller 122 senses the status change and passes this adjustment on to PC 104. When the user thereupon retrieves the sophisticated GUI for display on monitor 110, the adjusted setting of the volume has been processed and the status displayed conforms with the most recent user-interaction either via remote 112 or user-interface 120.

Device interface 106 monitors the heart beat of PC 104. PC 104 sends a data stream to sub-system 102 wherein periodically a special command occurs. The sole purpose of this command is to notify the system of the fact that PC 104 is still running. The special command is commonly referred to as "heart beat". Typically, a heart beat is sent one every second. Device interface 106 has a fail safe timer 124. Upon receipt of a heart beat, timer 124 is reset. The timer expires after, say, 2 seconds, which is substantially longer than the time period between two successive heart beats. When PC 104 stalls, device interface 106 stops receiving the heart beat, and timer 124 expires. This confirms that PC 104 has become inert and is not capable of controlling sub-system 102. Now, sub-system 102 continues to provide audio and video services, but independently of PC 104 and with a simplified conventional on-screen display. For example, upon a crash of PC 104 or during a reboot, the user keeps interacting with sub-system 102 via remote 112 as with any other conventional system in order to change TV channels or audio sources, or in order to change the monitor input from TV to VCR.

Figure 2:
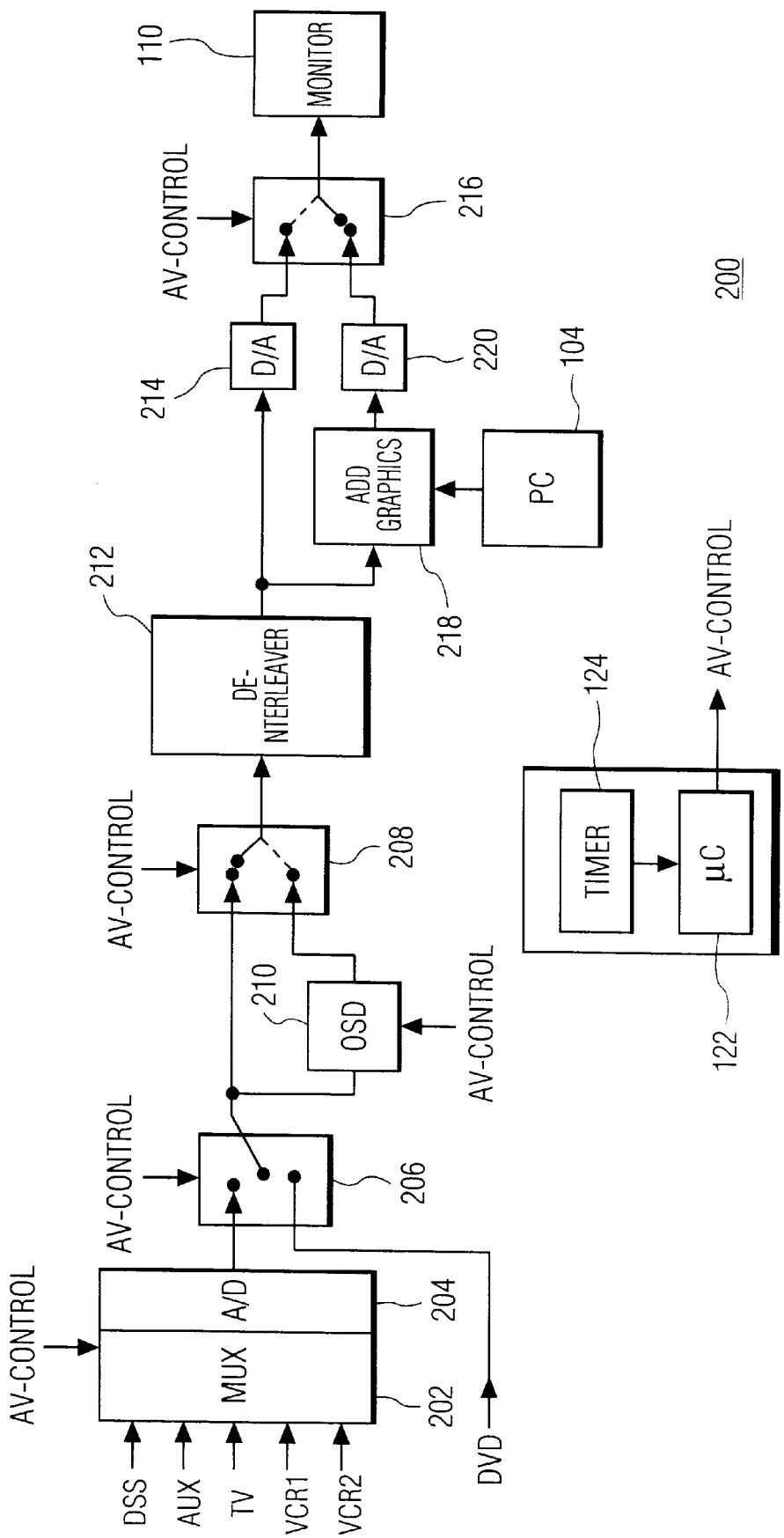
FIGS. 2 and 3 are block diagrams of the video/graphics data path in different embodiments of the system of the invention.

FIG. 2 is a block diagram of a first embodiment of a video/graphics data path 200 from various sources to monitor 110. Path 200 is controlled by both sub-system 102 and PC 104. Path 200 comprises a multiplexer MUX 202 that has inputs for receipt of analog signals DSS, AUX, TV, VCR1, and VCR2, for example. MUX 202 has an output connected to an AD-converter 204. The output of AD-converter 204 is connected to one input of first switch 206, the other input of which receives the digital signals from a DVD. Switch 206 is controlled by remote 112 via microcontroller 122. The output of switch 206 is connected directly to one input of a second switch 208. The output of switch 206 is also coupled to the other input of switch 208 via an OSD device 210 that takes care of simple on-screen display features. Switch 208 and OSD device 210 are controlled through remote 112. The output of switch 208 goes to a de-interleaver 212. As known, video sources typically transmit the odd lines and the even lines of an image alternately so that the lines have to be reordered (or: de-interleaved) at the receiving end. The output of de-interleaver 212 is coupled via a DA-converter 214 to one input of a third switch 216. The output of de-interleaver 212 is also coupled to the other input of switch 216 via a circuit 218 for adding graphics to the output signal of de-interleaver 212 under control of PC 104, and another DA-converter 220. The output of switch 216 goes to SVGA monitor 110. In this example, components 202–220 are integrated within sub-system 102, but it is clear that other configurations are possible, e.g., one wherein some of the components 202–220 are accommodated in device interface 106.

As mentioned above, system 100 has a fail safe timer 124 that expires when PC 104 stops sending its heart beat. If fail safe timer 124 expires, microcontroller 122 sets switches 208 and 216 in the positions indicated by the dotted line. In this case, data path 200 still lets OSD device 210 control the on-screen display of simple messages in a conventional manner as opposed to the full graphics supplied under a GUI software application run on PC 104. Note that graphics circuit 218 has been shunted in this case. In essence, what remains is the conventional data path for consumer electronics equipment. Alternatively, if fail safe timer 124 expires microcontroller 122 sends a request to PC 104 to check if PC 104 is responsive. If PC 104 does not respond, controller 122 sets switches 208 and 216 as discussed above. If PC 104 responds timer 124 is reset. This approach provides an additional safety check so as not to set switches 208 and 216 prematurely.

Figure 3:
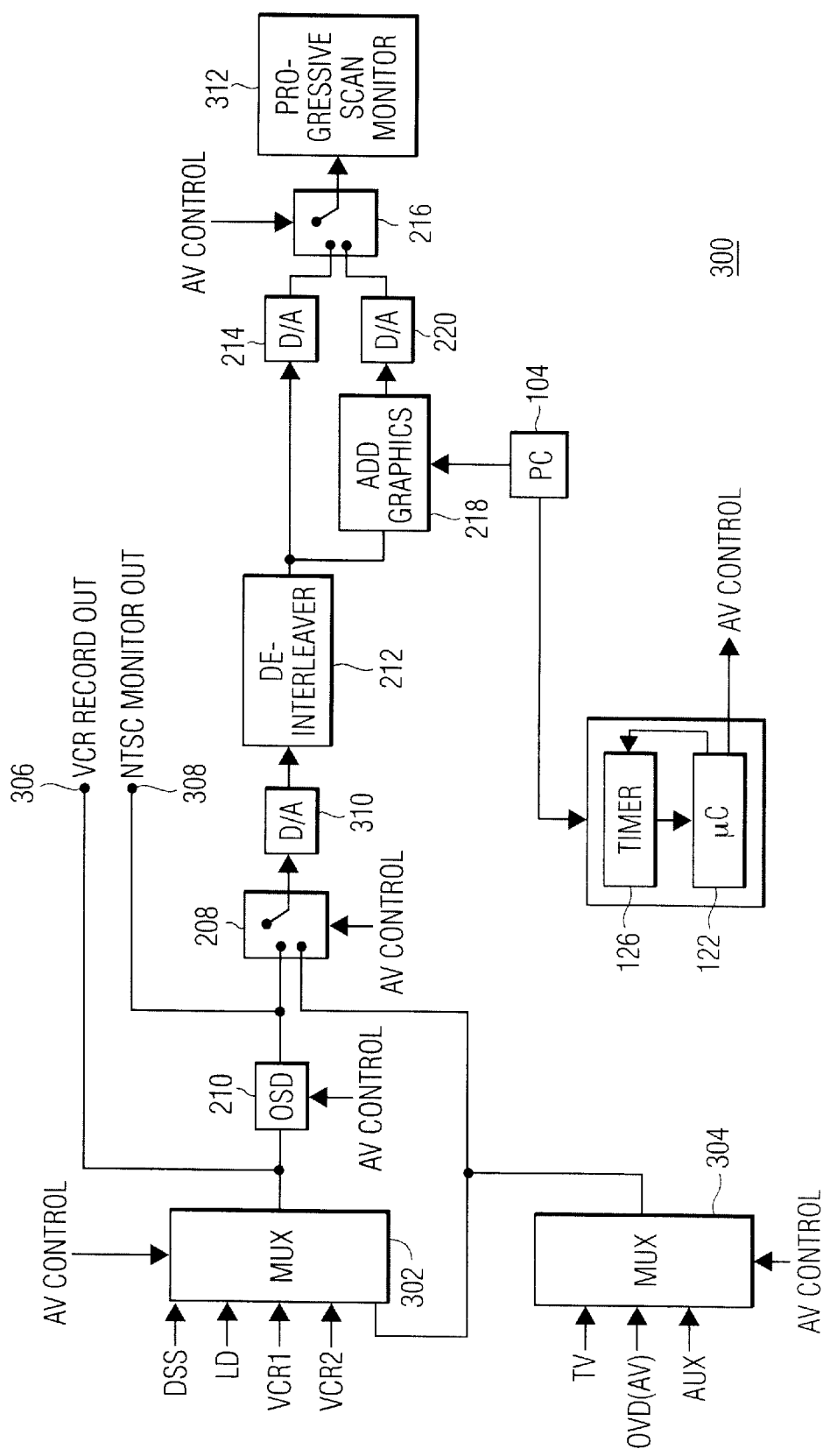

FIG. 3 is a block diagram of a second embodiment of a video/graphics data path 300 from various sources to monitor 110. The differences with respect to embodiment 200 relate to the different input signals. Path 300 has a multiplexer 302 receiving analog signals DSS, VCR1, VCR2 (discussed above), an analog input signal LD (laser disc) and an analog signal from the output of a multiplexer 304. Multiplexer 304 receives input signals TV and AUX (discussed above) and the analog video signal stemming from a DVD. Both multiplexers 302 and 304 are controlled via microcontroller 122. The output of multiplexer 302 is connected to an output node 306 for connection to a record input of a VCR. The output is also connected to OSD 210. The output of OSD 210 is connected to a node 308 for connection to an input of a standard NTSC monitor. The output of OSD 210 and the output of multiplexer 304 are both connected to switch 208, whose output is coupled to de-interleaver 212 via an AD converter 310. PC 104 supplies a heart beat to timer 124. For example, the heart beat rate depends on the mode of operation of PC 104. PC 104 notifies controller 122 of a change to another mode so that controller 122 programs timer 124 to expire after different time periods appropriate for different heart beat rates. In another example, PC 104 notifies controller 122 of going into a sleep mode wherein the heart beat is suspended. Absence of the heart beat then is not an indication of PC 104 having crashed, and timer 124 is reset and frozen. Upon awakening, PC 104 notifies controller 122 which then unfreezes timer 124, and the heart beat supply is resumed.

The remainder of path 300 is similar to path 200 apart from that the output of switch 216 is connected to an input of a progressive scan monitor 312. Another name for a non-interlaced picture is progressive scan. Removing interlace reduces visible line structure by about 50%, i.e., this has the same perceived effect as increasing the number of lines by 50%. Non-interlaced pictures look considerably more solid and stable. With interlacing, fine details that correspond to only one line are presented at half field rate, i.e., they are seen to flicker. If the detail is distributed among two lines it appears to jump up and down. This is referred to as line twitter. Progressive scan also produces slightly brighter images since each line of phosphor is being refreshed at double the conventional frequency.

Sub-system 102 and device-interface 106 are shown as separate blocks in the diagram of FIG. 1. Note that device interface 106 can also, at least partly, be physically integrated with sub-system 102. Similarly, IR-eye 114 can be integrated within either sub-system 102 or with device interface 106.

The information of co-pending U.S. patent application Ser. No. 08/880,387 with the title "SLAVE DSP REBOOTS STALLED MASTER CPU" is herewith incorporated by reference. This copending patent application discusses a digital home entertainment system that comprises one or more slave processors, e.g., DSPs, for processing specific tasks, and a master processor, e.g., a CPU, for control of the system. The slave processor is capable of rebooting the master processor if the master processor has stalled. This slave-controlled rebooting avoids manual cold rebooting of the system and is particularly advantageous in open-architecture multimedia systems with asynchronously cooperating components.

We claim:

1. An information processing system comprising:
   a sub-system for selectively providing specific content information;
   a computer coupled to the sub-system for running a software application to control the providing of the specific content information;
   a first user-interface structure coupled to the computer for user-control of the specific content information via interaction with the software application;
   a second user interface structure coupled to the sub-system for user control of the specific content information independently of the computer; and
   a disabling circuitry for testing if the computer is capable of controlling the sub-system and for disabling influence of the computer over the specific content information upon a negative test result.

2. The system of claim 1, comprising a data path coupled to between the computer and the sub-system for data transport supplied by the computer, wherein the disabling circuitry disables the data path upon the negative test result.

3. The system of claim 1, wherein:
   the computer supplies a heart beat;
   the disabling circuitry has a timer resettable by the heart beat; and
   the disabling circuitry disables the data path upon expiry or the timer.

4. The system of claim 3, wherein:
   the computer supplies a heart beat of a first rate when it is in a first mode of operation, and a heart beat of a second rate different from the first rate when it is in a second mode of operation;
   the disabling circuitry progress the timer's expiry dependent on the heart beat rate received in the first and second modes.

5. The system of claim 1, wherein:
   the system has a device interface for interconnecting the computer and the sub-system; and
   the disabling circuitry is accommodated in the device interface.

* * * * *